United States Patent [19]
Anthony et al.

[11] Patent Number: 5,400,875
[45] Date of Patent: Mar. 28, 1995

[54] BRAKE APPLICATION MECHANISM FOR A DISC BRAKE

[75] Inventors: Paul Anthony, Bürstadt; Rainer Baumgartner, Mannheim; Andrzej Bielawski, Ladenburg; Wlodzimierz Macke, Viernheim; Bernd Rupprecht, Edingen-Neckarhausen; Wilfried Strauss, Wald-Michelbach; Jürgen Tempel, Wachenheim, all of Germany

[73] Assignee: Perrot Bremsen GmbH, Mannheim, Germany

[21] Appl. No.: 206,672

[22] Filed: Mar. 7, 1994

[30] Foreign Application Priority Data

Mar. 5, 1993 [DE] Germany .......... 43 07 019.1

[51] Int. Cl.6 ............................................. F16D 65/16
[52] U.S. Cl. ............................. 188/72.9; 188/106 F
[58] Field of Search ............... 188/72.1, 72.6, 72.7, 188/72.8, 72.9, 106 F, 106 P, 196 V; 192/93 R

[56] References Cited

U.S. PATENT DOCUMENTS

| | | | |
|---|---|---|---|
| 3,332,521 | 7/1967 | Burnett | 188/72.9 X |
| 3,830,343 | 8/1974 | Gardner | 188/72.9 X |
| 4,109,765 | 8/1978 | Johannesen | 188/72.7 |

FOREIGN PATENT DOCUMENTS

| | | |
|---|---|---|
| 0291071B1 | 11/1988 | European Pat. Off. . |
| 3411745 | 10/1985 | Germany . |
| WO92/07202 | 4/1992 | WIPO . |

*Primary Examiner*—Robert J. Oberleitner
*Assistant Examiner*—Kevin D. Rutherford
*Attorney, Agent, or Firm*—Jacobson, Price, Holman & Stern

[57] ABSTRACT

A brake application mechanism for a disc brake, particularly a sliding-caliper disc brake having an application shaft which extends parallel to the plane of the brake disc, wherein on the side of the shaft (8) which faces the brake disc (2) the shaft is supported against a thrust piece (9) which is movable against the brake disc (2), support being via a circularly arcuate first contour (17) which is rotatably mounted in a suitable bearing seat (18), and on the side of the shaft which faces away from the brake disc, the shaft is supported against an element with respect to which the thrust piece (9) is movable, support being via a second contour (21) which is eccentric with respect to the first contour. The second contour has at least two circular arcs (I, II) with their centers (P1, P2) and radii (R1, R2) chosen so that when the application shaft is rotated the magnitude of any movement of the thrust piece (9) relative to the application shaft (8) in a direction parallel to the plane of the brake disc is minimized.

20 Claims, 4 Drawing Sheets

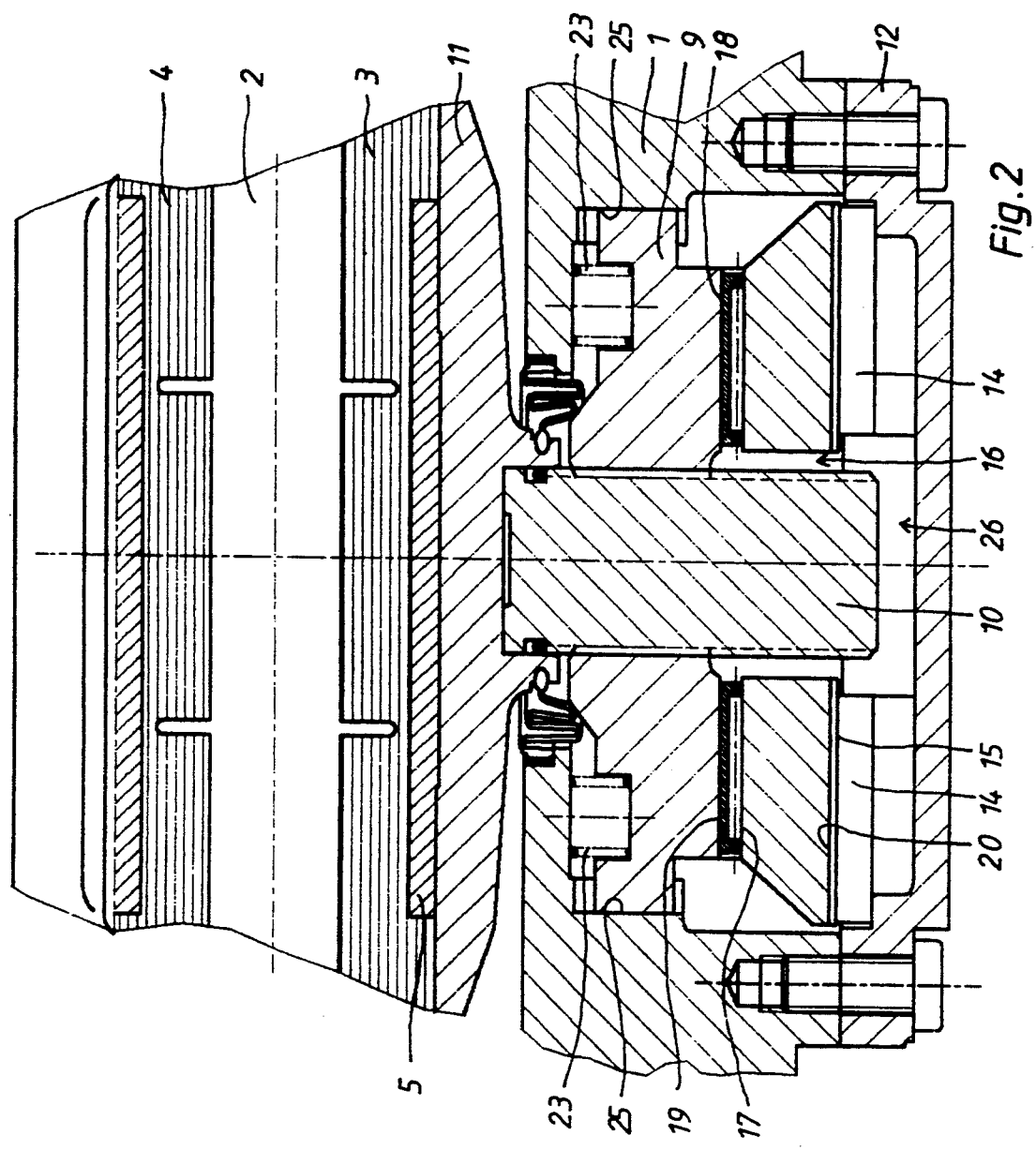

BRAKE APPLICATION MECHANISM FOR A DISC BRAKE

BACKGROUND OF THE INVENTION

The invention relates to a brake application mechanism for a brake, particularly for a sliding-caliper disc brake having an application shaft which extends parallel to the plane of the brake disc. More particularly, the invention relates to such a mechanism wherein on the side of the shaft which faces the brake disc the shaft is supported against a thrust piece which is movable against the brake disc by a circularly arcuate first contour which is rotatably mounted in a suitable bearing seat, and on the side of the shaft which faces away from the brake disc, the shaft is supported against an element with respect to which the thrust piece is movable by a second contour which is eccentric with respect to the first contour.

An application device of the type described above is known from German Patent Document OS 40 32 885 A1. The first contour and the bearing in the device engage each other such that the application shaft can serve simultaneously as the bearing means for the thrust piece, thereby obviating bearing and guide means for the thrust piece. The second contour in the known device is in the form of a circular arc. Because the two circular arcs, namely that of the first contour and that of the second contour, are mutually eccentric, when the application shaft is rotated the thrust piece executes a tilting movement in a plane perpendicular to the axis of the brake disc.

An angular attitude of the thrust piece results, so that when the brake is actuated the brake shoe assumes a corresponding angular attitude, with deleterious effects on the braking process as well as uneven wear on the brake linings.

In the known application devices disclosed in German Patent 26 14 321 C2, European Patent 0 291 073 B1, and German Patent OS 34 11 74b A1, the application shaft on the one side and thrust piece on the other side are respectively decoupled by suitable means, to avoid tilting of the thrust piece. The decoupling is accomplished by a sphere, a transversely movable plate, or a thrust rod between the application shaft and the thrust piece. However, a result of the decoupling is that the application shaft and thrust piece cannot be held together and guided together, which necessitates flexible holding means for the application shaft in the cited application devices according to the state of the art; e.g., the spring 86 in German Patent 26 14 321 C2. The decoupling renders the position of the application shaft unstable, and as a result the brake application process is uneven.

BRIEF SUMMARY OF THE INVENTION

The object of the present invention is to improve an application device of the type described above, such that the thrust piece and application shaft are held together and guided together, without tilting or oscillation detrimental to the braking action or to the evenness of wear of the brake linings.

This object is achieved according to the invention, in that the second contour is comprised of at least two circular arcs with their centers and radii chosen such that when the application shaft is rotated the magnitude of any movement of the thrust piece relative to the application shaft in a direction parallel to the plane of the brake disc is minimized.

The invention is based on the recognition of the amazingly simple principle that the choice of a suitable second contour enables minimizing or eliminating the relative movement, so that there is no detriment to the braking action and no irregular wear of the brake linings when the application shaft engages the thrust piece in connection with the support and guiding of the thrust piece by the application shaft.

The inventive application device is more compact and has fewer individual parts than the known application devices.

According to a particularly preferred embodiment, neighboring circular arcs of the second contour are mutually tangent on their common boundary. Such a "smooth" transition from one arc to the other ensures smooth braking without "step transitions" or other irregularities.

It is particularly preferred for the second contour to be in the form of a cycloid, which may be conceived of as a curve comprised of an infinite number of circular arcs. If the second contour is a cycloid, when the application shaft is rotated there is no movement of the thrust piece relative to the application shaft in a direction parallel the plane of the brake disc.

According to another embodiment of the invention, the second contour may be comprised of two circular arcs, one associated with the idle excursion and one with the forceful excursion. Thus the common boundary of the arcs is precisely at the transition between the idle excursion and the forceful excursion.

With this embodiment it is preferred that the circular arc on the second contour which arc is associated with the idle excursion be of a smaller radius than the circular arc associated with the forceful excursion. Because during the idle excursion the contact pressure of the surfaces between the second contour and the element with respect to which the thrust piece is movable is a low pressure, there is no adverse consequence during the idle excursion if the thrust piece moves slightly in a direction parallel to the plane of the brake disc. The relatively low contact pressure also enables a small radius to be used without detriment. When the forceful excursion is reached, the application shaft is supported at a circular arc having a greater radius, which is needed in view of the increased contact pressure. Meanwhile, the movement of the thrust piece relative to the application shaft in a direction parallel to the plane of the brake disc is less when the radius is larger.

To reduce friction, according to the invention an antifriction bearing may be provided between the first contour and the bearing seat.

To stabilize the overall apparatus, according to the invention the second contour may be axially longer than the first contour.

Further, according to the invention the thrust piece may be guided on all sides with little play, in semi-cylindrical guideways in the caliper housing. This provides radial and lateral guide means for the thrust piece.

Finally, according to the invention, prestressing means may be provided which tend to release the brake, said means preferably comprising at least one prestressing compression spring which urges the thrust piece in a direction away from the brake disc.

BRIEF DESCRIPTION OF THE DRAWINGS

The invention will be described in more detail hereinbelow on the basis of a preferred embodiment, with reference to the accompanying drawings wherein:

FIG. 2 is an enlarged cross-sectional view taken along line 2—2 of FIG. 1;

DETAILED DESCRIPTION

Figure 1:
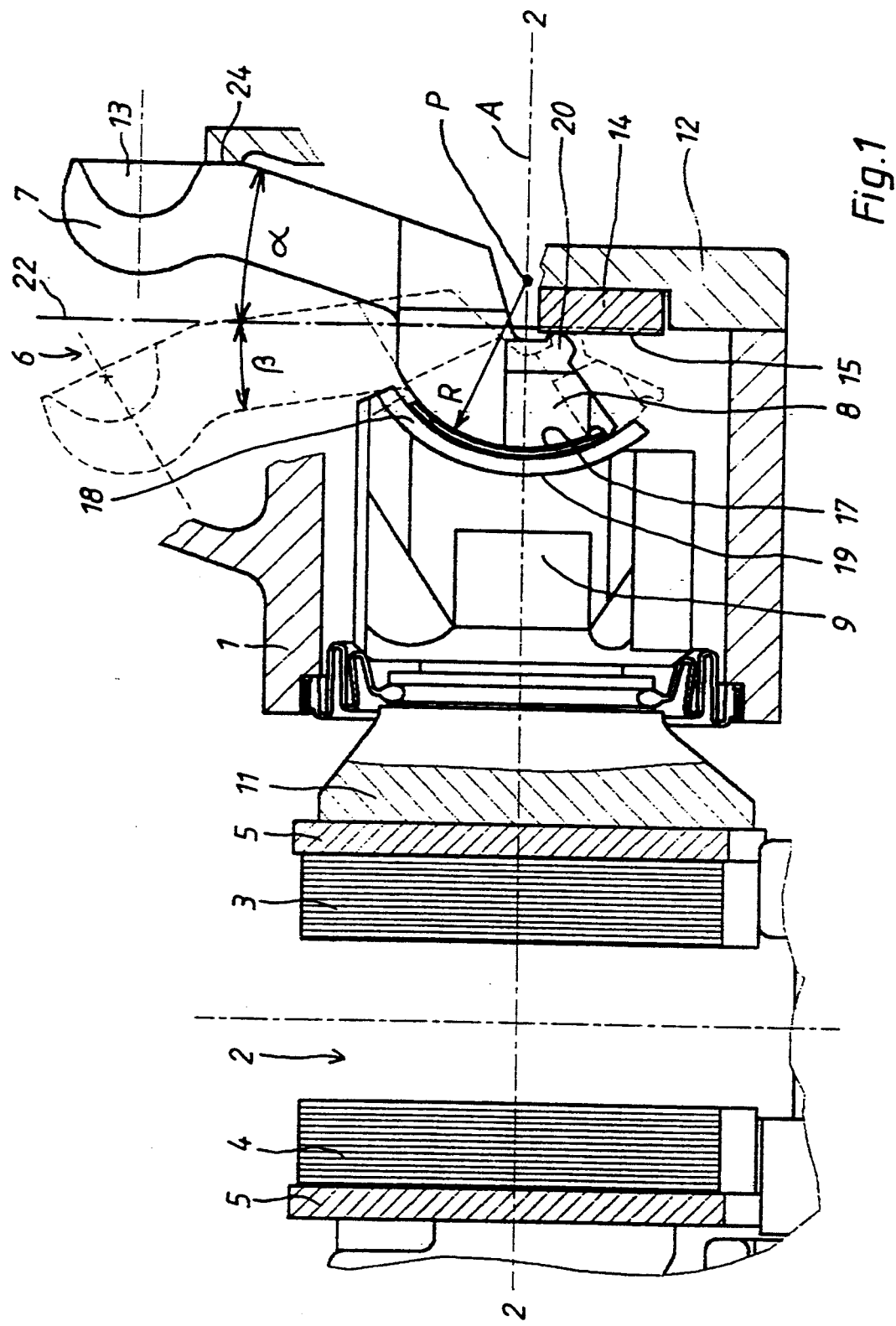
FIG. 1 is a cross-sectional view perpendicular to the plane of a disc brake with an application device according to an exemplary embodiment of the invention.

The disc brake illustrated in the drawings is a sliding-caliper disc brake, having a brake caliper 1 the two legs of which extend over a brake disc 2, in customary fashion. Brake linings 3, 4 disposed on lining supports 5 on both aides of the disc are guided and supported in a brake bracket (not shown) or in the housing of the caliper 1. The caliper 1 is mounted so as to be slidable in the direction perpendicular to the disc, with the aid of guide means (not shown in detail). The caliper 1 has an application mechanism 6 on one side for applying the brake.

The application mechanism 6 is comprised essentially of a brake lever 7 which is connected to an application shaft 8 disposed parallel to the plane of the brake disc, a thrust piece 9 which can be slid within the caliper 1, and a thrust spindle 10 screwed into the center of the thrust piece 9 in the plane of the brake axis A of the application device 6. In the part of the thrust spindle 10 closest to the disc 2, a thrust head 11 is coupled to the spindle 10, which thrust head abuts against the lining support 5. The thrust head 11 extends approximately over the entire width of the lining. The thrust piece 9 is guided on all sides in semicylindrical lateral guideways 25 in the caliper 1, with small bearing play.

A cover 12 is affixed to the caliper 1, which cover provides a connection to a brake cylinder (not shown). The brake lever 7 mediates the connection between the brake cylinder (or a brake connecting rod, also not shown) and the application shaft 8. A support plate 14 is accommodated in or disposed in front of the cover 12, in the caliper 1, in a plane parallel to the brake disc 2. Plate 14 has a support surface 15 against which the application shaft 8 abuts. The support plate 14 may be segmented or of unit construction. Its length depends on the configuration of the application shaft 8, which will be described infra. According to FIGS. 2 and 3, a free throughgoing opening 16 is provided in the middle region of the application shaft 8, for axial disposition of the thrust spindle 10 (i.e. the thrust spindle 10 extends perpendicular to the brake disc but transversely to the axis of the application shaft 8).

Obviously the application shaft 8 may be configured without a free throughgoing opening 16 but rather in a generally uninterrupted contour, so that the brake application may be accomplished via two thrust spindles 10 each of which is screwed onto a respective outer end of the thrust piece 9.

The particularly compact structure of the application device enables provision of a void space 26 on the brake-disc side of the application shaft 8 and thus in the force-free region of the brake. This space may be used to house an adjusting device, e.g., of the type described in a related patent application of like date. With this arrangement the adjusting device may be installed as a pre-manufactured module. It is not exposed to appreciable stress (mechanical or thermal or with regard to contamination).

Figure 4:
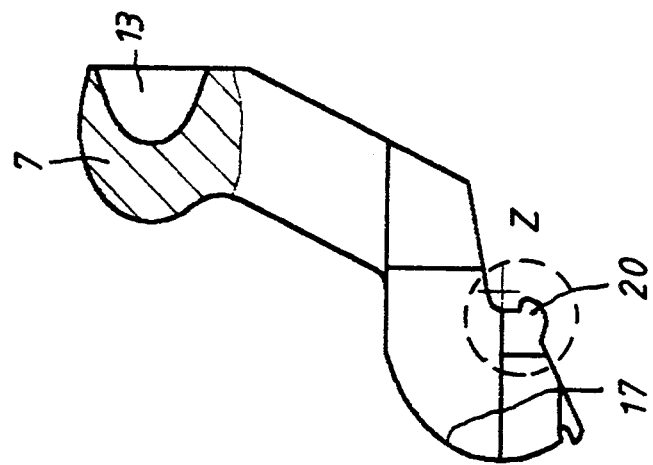
FIG. 4 is a side view of the shaft of FIG. 3.
Figure 3:
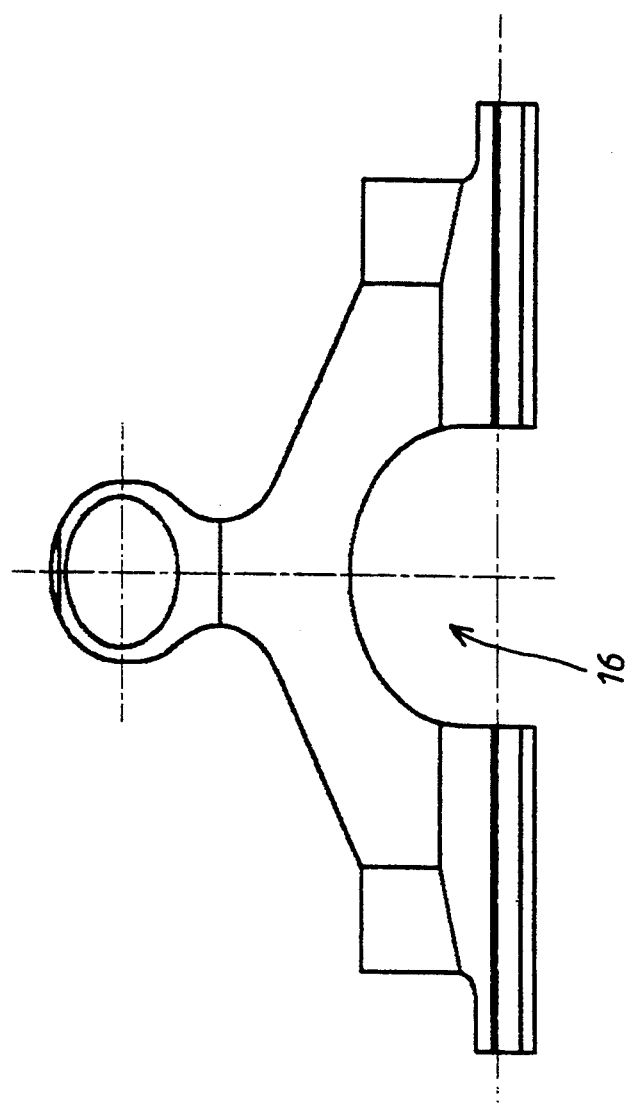
FIG. 3 is an elevational view of the application shaft in the disc brake according to FIGS. 1 and 2.
Figure 5:
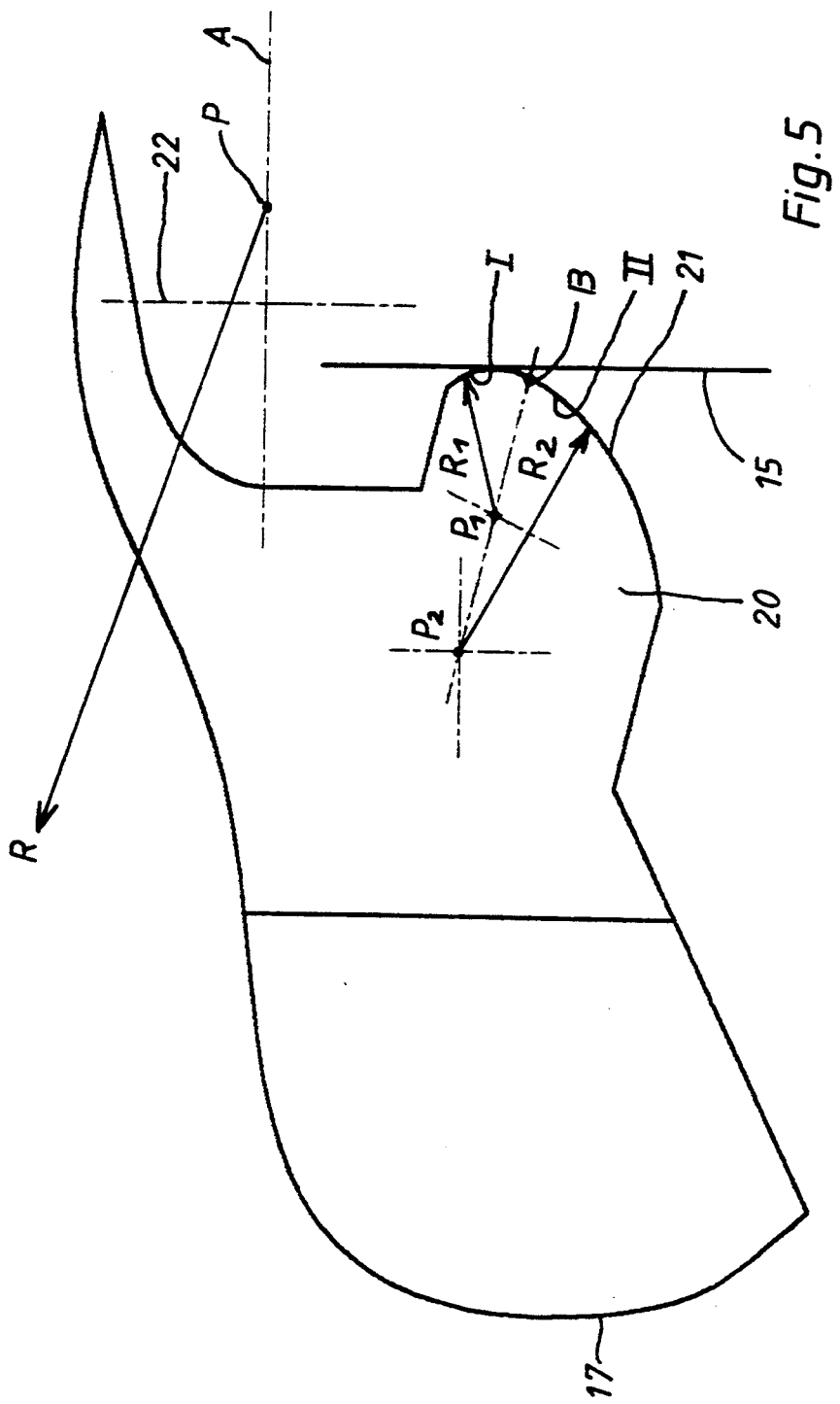
FIG. 5 is an enlarged detail Z of FIG. 4.

FIGS. 3 and 4 show the contour of the application shaft 8. FIG. 5 is an enlarged view of detail Z.

On the side of the application shaft 8 which is disposed toward the brake disc, the shaft has an approximately semicylindrical projection 17 with a radius R. The center P of the cylinder lies on the brake axis A. The shell surface of the projection 17 extends parallel to the rotational axis of shaft 8, which axis moves over the interval P1,P2—(see infra and FIG. 5) in correlation with the rotation of the application shaft 8. The projection 17 is rotatably mounted via an interposed antifriction bearing 18 (e.g. a roller and/or sliding bearing) in associated interior cylindrical surfaces 19 of the thrust piece 9. In this way a relatively large-surfaced contact contour is provided between these two parts for support on all sides and uniform transmission of thrust. Obviously, the projection may be provided on element 9, with the (inner) cylindrical surface being provided on element 8; however, the above described configurations are preferred.

The shell surface of a thrust ridge 20 disposed parallel to projection 17, which ridge abuts a support surface 15, is formed by a curve 21 which constitutes a succession of a plurality of curved segments (here two in number). The first segment I is a part of a circular arc with radius R1, around point P1 which point does not coincide with the point P. The second curved segment II which adjoins the first segment I is a part of a circular arc with radius R2, around point P2 which coincides neither with point P nor point P1. Radius R1 is less than radius R2. The radii R1 and R2, and the respective positions of points P1 and P2, are chosen such that the two arcs are tangent in a common boundary line B.

The following advantage in particular is afforded by the illustrated configuration of the curve 21 of the shell surface of thrust ridge 20: during the initial rotation of the application shaft 8, to execute the idle excursion $\alpha$ within the limits of the brake clearance, the surface of the first curved segment I with the smaller radius R1 rolls in the angular direction radially inward along the support surface 15 on the caliper, up to the boundary line B. Because the surface pressure between the shell surface and support surface is still relatively small during the idle excursion, there is no detriment if in this region the eccentric undergoes a slight upward movement on an arc in the direction of a vertical 22. The rolling results in axial translation of the thrust piece 9 toward the brake disc 2.

As the application shaft 8 is rotated further, during the forceful excursion B, the shell surface of the adjoining second curved segment II with the larger radius R2 rolls farther in the angular direction, or radially, downward from the boundary line B, on the support surface 15. One result of this is that intensified contact pressure of the surfaces which is present during the forceful excursion B is better borne by the greater radius R2. The principal result is that neither the eccentric nor the point P moves beyond the vertical 22 (i.e., the eccentric P1 does not move rightward of 22 and the rotational axis P does not move leftward of 22). Thus there is no undesirable tilting. In particular, the rolling segment in the angular direction (radially inward) via the larger radius R2 is longer for a given axial displacement of the thrust piece 9 than via the first rolling segment via the radius R1.

As seen from the above description, particularly on the segment II the rotational axis of the application shaft 8 "moves" continuously radially inward at a higher rate than the eccentric center swings upward on the arc in the direction of the vertical 22. Because thereby the center of rotation P does not go leftward beyond the vertical 22 in the excursion $\beta$, due to "neutralization" of the tilting movement, the application along brake axis A toward the brake disc 2 is approximately linear, without giving rise to appreciable compressive stressing in the caliper guideways 25.

The disposition of the thrust ridge 20 with respect to the support surface 15 of the brake caliper 1 affords another advantage as well, namely compensation for tolerances with respect to the antifriction bearings which tolerances are occasioned by manufacturing and assembly. Obviously, here too the opposite configuration is possible, with the thrust ridge 20 on the support plate 14 and support surface 15 on the application shaft 8; however, the above described embodiment is preferred.

By means of at least one compression spring 23 the application mechanism (thrust piece, bearing, and application shaft) is pre-stressed in the direction toward the support surface 15, and thereby the brake lever 7 is pre-stressed against a caliper detent 24.

FIG. 2 shows that the thrust ridge 20 is longer than the antifriction bearing 18. In this way the stresses on the ridge are comparable to the stresses on the bearings; also, optimal use of space in the caliper is enabled.

Obviously, the principle of brake application according to FIG. 1, particularly the configuration and bearing arrangement of the application shaft, may be adapted to a hydraulic disc brake with mechanical actuation when operated as a parking brake. In such an application, the surface pressures against the caliper support are lower because the application forces are lower, and the courses he curved segments I and II may be reversed, with the larger radius coming first and then the smaller radius, to form a combined curve 21. This brings about a very precise linear application movement of the thrust piece 9.

The features of the invention disclosed in the preceding description, the claims, and the drawings, may be essential singly or in any desired combination, for realizing the invention in its various embodiments.

We claim:

1. In a brake application mechanism for a sliding-caliper disc brake having an application shaft extending parallel to the plane of the brake disc wherein on the side of said shaft which faces said brake disc, said shaft is supported against a thrust piece movable against said brake disc by a circularly arcuate first contour rotatably mounted in a bearing seat, and on the side of said shaft which faces away from said brake disc said shaft is supported against an element with respect to which said thrust piece is movable by a second contour which is eccentric with respect to said first contour, the improvement wherein said second contour comprises at least:
   a first circular arc having a first center and a first radius; and
   a second circular arc having a second center and a second radius;
   the relative positions of said first and second centers with respect to said application shaft and the lengths of said first and second radii being determined so that when said application shaft is rotated the magnitude of any movement of said thrust piece relative to said application shaft in a direction parallel to the plane of said brake disc is minimized.

2. The application mechanism as claimed in claim 1 wherein:
   said first and second circular arcs merge at a common boundary and are mutually tangent at said common boundary.

3. The application mechanism as claimed in claim 2 wherein:
   said second contour comprises a cycloid.

4. The application mechanism as claimed in claim 3 wherein:
   said second contour is axially longer than said first contour.

5. The application mechanism as claimed in claim 4 and further comprising:
   semicylindrical guideways in said caliper engaging said thrust piece for guiding said thrust piece on all sides thereof.

6. The application mechanism as claimed in claim 2 wherein:
   one of said circular arcs is associated with an idle excursion of said shaft and the other of said circular arcs is associated with a forceful excursion of said shaft.

7. The application mechanism as claimed in claim 2 and further comprising:
   an antifriction bearing between said first contour and said bearing seat.

8. The application mechanism as claimed in claim 2 wherein:
   said second contour is axially longer than said first contour.

9. The application mechanism as claimed in claim 2 and further comprising:
   semicylindrical guideways in said caliper engaging said thrust piece for guiding said thrust piece on all sides thereof.

10. The application mechanism as claimed in claim 2 and further comprising:
    prestressing means for urging said brake toward the release position thereof.

11. The application mechanism as claimed in claim 10 wherein:
    said prestressing means comprises a prestressing compression spring urging said thrust piece in a direction away from said brake disc.

12. The application mechanism as claimed in claim 1 wherein:
    said second contour comprises a cycloid.

13. The application mechanism as claimed in claim 12 and further comprising:
    an antifriction bearing between said first contour and said bearing seat.

14. The application mechanism as claimed in claim 1 wherein:
    one of said circular arcs is associated with an idle excursion of said shaft and the other of said circular arcs is associated with a forceful excursion of said shaft.

15. The application mechanism as claimed in claim 14 wherein:
    said first circular arc is associated with said idle excursion;

said second circular arc is associated with said forceful excursion; and said first radius is smaller than said second radius, 16. The application mechanism as claimed in claim 1 and further comprising:

prestressing means for urging said brake toward the release position thereof.

17. The application mechanism as claimed in claim 16 wherein:

said prestressing means comprises a prestressing compression spring urging said thrust piece in a direction away from said brake disc.

18. The application mechanism as claimed in claim 1 and further comprising:

an antifriction bearing between said first contour and said bearing seat.

19. The application mechanism as claimed in claim 1 wherein:

said second contour is axially longer than said first contour.

20. The application mechanism as claimed in claim 1 and further comprising:

semicylindrical guideways in said caliper engaging said thrust piece for guiding said thrust piece on all sides thereof.

* * * * *